UNITED STATES PATENT OFFICE.

EMIL KNOEVENAGEL, OF HEIDELBERG, GERMANY, ASSIGNOR TO THE FIRM OF KNOLL AND COMPANY, OF LUDWIGSHAFEN-ON-THE-RHINE, GERMANY.

MODIFYING ACETYL-CELLULOSES.

1,241,995.  Specification of Letters Patent.  Patented Oct. 2, 1917.

No Drawing.  Application filed January 29, 1913.  Serial No. 745,005.

*To all whom it may concern:*

Be it known that I, Dr. EMIL KNOEVENAGEL, professor of chemistry, a subject of the German Emperor, residing at Heidelberg, Baden, Germany, have invented certain new and useful Improvements Modifying Acetyl-Celluloses, of which the following is a specification.

The present process serves for the conversion of acetyl-celluloses of any origin which are insoluble in acetone, into products which are easily soluble and viscidly soluble in acetone.

The process consists in re-arranging by heating and in a dissolved or at least strongly swelled state acetyl celluloses which are insoluble in acetone. This conversion may be carried out with advantage in the presence of disintegrating catalysts possessing a weak hydrolyzing action, such as sulfates, bisulfates, chlorids or nitrates with or (in the absence of acid anhydrids) without the presence of water or even by water alone without a catalyst. In the presence of acid anhydrids the water may be replaced by other substances which decompose acid anhydrids, such as alcohol, glycerin, etc. The process is based upon the new knowledge that the saponification and still more the hydrolytic decomposition of acetyl cellulose must take place at the very most to a slight degree only in the transformation of acetyl celluloses insoluble in acetone into products soluble in acetone, if valuable acetyl-celluloses viscidly soluble in acetone are to be obtained.

Hitherto the opinion has been widely disseminated that in the case of acetyl celluloses insoluble in acetone it was necessary, that partial saponification or hydrolysis or both should take place, in order to obtain from them acetyl celluloses soluble in acetone. All the earlier processes which have become known follow this view. In all the older processes therefore a strong saponifying or hydrolyzing action or both was always exerted. Thus for example according to the specification of French Patent No. 371447 insoluble acetyl celluloses are heated with aqueous strong acids, until they have become soluble in acetone. In the specification of American Patent No. 838350 also water is used in the presence of sulfuric acid (which exerts a very strong saponifying and hydrolyzing disintegrating action) and similar substances for the transformation of acetyl-celluloses insoluble in acetone into the soluble forms. In all these processes the water exerts a highly injurious collateral action owing to the strongly hydrolytic effect of the sulfuric acid and similar agents.

Just as the acetolytic action of the sulfuric acid has to be tempered by half or wholly neutralizing it with bases in the acetylation of cellulose, so must also the hydrolysis be modified in the conversion of acetyl-celluloses which are insoluble in acetone into those forms which are soluble in acetone.

In the specification of French Patent No. 14558 (patent of addition to French Patent No. 432046) the conversion of acetyl-celluloses which are insoluble in acetone into soluble products is effected merely by acid salts of sulfuric acid. In the said patent however and in contradistinction to the present process, they are used in the presence of a large quantity of water. If the directions given in the said patent for nitric acid for example be followed, using sodium bisulfate instead of nitric acid, (and even using primary solutions of acetyl cellulose in the same process) the valuable acetyl celluloses which can be prepared according to the present process are not obtained. It was necessary first to know, that hydrolysis of the acetyl cellulose molecule is not only a subordinate factor in the formation of products soluble in acetone, but is even injurious to the valuable viscidly soluble and elastic acetyl celluloses. When sulfates with a weak hydrolytic action are used, the quantity of water may, as follows from the same knowledge, and short of producing an injurious hydrolytic disintegration, be considerably increased in comparison with the quantities of water used with bisulfates, although the quantity of water even in this is by far not so great as that employed in the process described in the specification of French Patent No. 14558 and may even be omitted altogether in the absence of acid anhydrids. It is also known according to the specification of French Patent No. 371447 to convert acetyl-celluloses which are insoluble in acetone into products which are soluble in acetone in the presence of a large quantity of water and strong acids and by the partial saponification thereby produced. In the present process on the contrary, the conversion is, as has been already stated, directed into special channels, owing to the absence of large quantities of water and strong saponifying agents, which channels are less characterized by saponification and hydrolytic disintegration of the cellulose molecule, than by other reactions, probably intramolecular rearrangements.

The present process may therefore be carried out in a great variety of ways. The only condition is, that the additions of the catalyst with or without water, and even without the catalyst, be so proportioned that all saponifying or acetolytic action on the acetyl cellulose be retarded as much as possible.

If in the present process primary solutions still containing acetic acid anhydrid be started from, it will be necessary to take care in each case that the acid anhydrid is destroyed first as soon as possible, as otherwise the acid anhydrid will produce collateral acetolysis of the cellulose molecule, which always leads to the formation of acetyl celluloses which are of considerably less value and less viscidly soluble in acetone. The removal of the anhydrid may be effected both by the addition of water to the primary solutions, as well as by any other substances which easily undergo decomposition with acid anhydrids. When water is used to destroy the acid anhydrid, it is always necessary to use a certain excess over and above the theoretically necessary quantity. In the presence of catalysts with a saponifying or hydrolytic action this excess must not, however, be as great as that stated in the specification of French Patent No. 14558. In the presence of other substances instead of water, such as alcohol, glycerin, the acetins, etc., no such limitation is necessary on account of the lack of any hydrolytic action.

If the primary solutions contain a mildly acting catalyst this latter may, if it be already a sulfate, clorid or nitrate, be used directly for the conversion of the product which is insoluble in acetone into the one which is soluble in acetone. All that is necessary is, to destroy the anhydrid and heat the primary solution further.

If the catalyst employed in the acetylation of the cellulose was sulfuric acid, it must be decomposed after the acetylation has been effected, either by the addition of a corresponding quantity of a base or of a salt composed of a weak acid and a strong base, such as sodium acetate, so that the sulphuric acid be thereby converted into neutral sodium sulfate and the catalyst thereby entirely removed. Or, an organic or inorganic base or a salt of the same with a weak acid may be added in such quantity, that a bisulfate of the corresponding base or mixture of the same with sulfates is produced. After this the acid anhydrid is removed by the addition of water or the like and further heating of the primary solution is proceeded with, until repeatedly taken samples show a satisfactory solubility in acetone.

When adding the water to the primary solution, it is advantageous to do so in such a manner, that it shall be introduced quite gradually and if necessary even in a suitably diluted form, so as to prevent any injurious rise of temperature in the solution.

If a ready prepared acetyl-cellulose insoluble in acetone be started with, it is preferably dissolved in one of its solvents, such for example as glacial acetic acid, and to this solution, which may also if necessary be only a thick magma, may be added a small quantity of water, alcohol or the like, or a mildly acting catalyst or both together and the mixture heated at a suitably high temperature, until a repeatedly taken sample has become soluble in acetone.

The process may be explained by the following special examples which, however, as the above description shows, may be modified in many different ways:

1. A primary acetyl-cellulose solution in glacial acetic acid prepared according to the specification of German Patent No. 203178 with methylamin sulfate for example, is mixed with 0.8 parts of water for example to one part of cellulose and then heated to 70° for example, until the acetone-soluble products are formed.

2. As example 1, but instead of water 1.5 to 2 parts of alcohol, glycerin or the like are added and the solution heated to 70°, until a sample taken therefrom appears soluble in acetone. Instead of being prepared with methylamin sulfate, the primary solution may be prepared with any other mildly acting catalyst, such for example as methylamin bisulfate (containing 10% of methylamin sulfate) sodium ethyl sulfate, etc. The temperature for the conversion may in this case be lower or higher than 70°, according to the nature of the catalyst and the substance added for the decomposition of the excess of acetic acid anhydrid.

3. One part of cellulose is heated according to the specification of German Patent No. 203178 to 100°, until solution takes place, with four parts of glacial acetic acid, 0.1 parts of chlorid of zinc and five parts of acetic acid anhydrid. One part of water is then added and the mixture heated to 70°, until a repeatedly taken sample shows that the acetyl-cellulose has become soluble in acetone. Instead of the chlorid of zinc, other chlorids or nitrates may be used at 70° or at other for instance higher temperatures. Instead of water, 1 to 2 parts of alcohol or monacetin or other similarly acting substances may be used, so that the anhydrid is completely decomposed.

4. Ready prepared acetyl-cellulose insoluble in acetone is heated with glacial acetic acid, or glacial acetic acid containing about 6 to 10% of water, or glacial acetic acid containing from 10 to 20 per cent. of alcohol or the like in the proportion of one:nine to about 100°, until a repeatedly taken out sample proves to be soluble in acetone.

5. One part of cellulose is acetylated at ordinary temperature up to 70° with five parts of acetic acid anhydrid, six parts of glacial acetic acid and 0.4 parts of methylamin sulfate or nethylamin bisulfate or orthotoluidin-bisulfate containing one molecule of water of crystallization, or the like. After the cellulose has dissolved, the acetyl-cellulose is converted at approximately 40° to 30° with the gradual addition of water into an acetone soluble product. The experiment was carried out with 96% glacial acetic acid.

What I claim is:—

1. The process for the conversion of acetone-insoluble acetyl-celluloses into acetyl-celluloses, easily soluble in acetone, which consists in heating the acetone-insoluble acetyl-celluloses, in the presence of a substance which will produce only a slight hydrolytic decomposition of the acetyl cellulose until the specified solubility has been produced, substantially as described.

2. The process for the conversion of acetyl-celluloses insoluble in acetone into acetyl-celluloses easily soluble in acetone, which consists in dissolving the acetone-insoluble acetyl-celluloses in one of their solvents, and heating the solutions, until the specified solubility has been produced, substantially as described.

3. The process for the conversion of acetone-insoluble acetyl-celluloses into acetyl-celluloses soluble in acetone, which consists in heating the acetyl-celluloses insoluble in acetone in the presence of a substance which will produce only a slight hydrolytic decomposition of the acetyl cellulose and small quantities of water, until the specified solubility has been produced, substantially as described.

4. The process for the conversion of acetone-insoluble acetyl-celluloses into acetyl-celluloses easily soluble in acetone, which consists in heating acetone-insoluble acetyl-celluloses containing acetic anhydrid with the quantity of water necessary for the decomposition of the anhydrid, until the specified solubility has been produced, substantially as described.

In testimony whereof I have hereunto set my hand in presence of two subscribing witnesses.

Dr. EMIL KNOEVENAGEL.

Witnesses:
 Carl Witte,
 Joseph Pfeiffer.